Sept. 6, 1932.  W. P. HAWKINS  1,876,498
BRAKE RELEASE
Filed Jan. 8, 1932
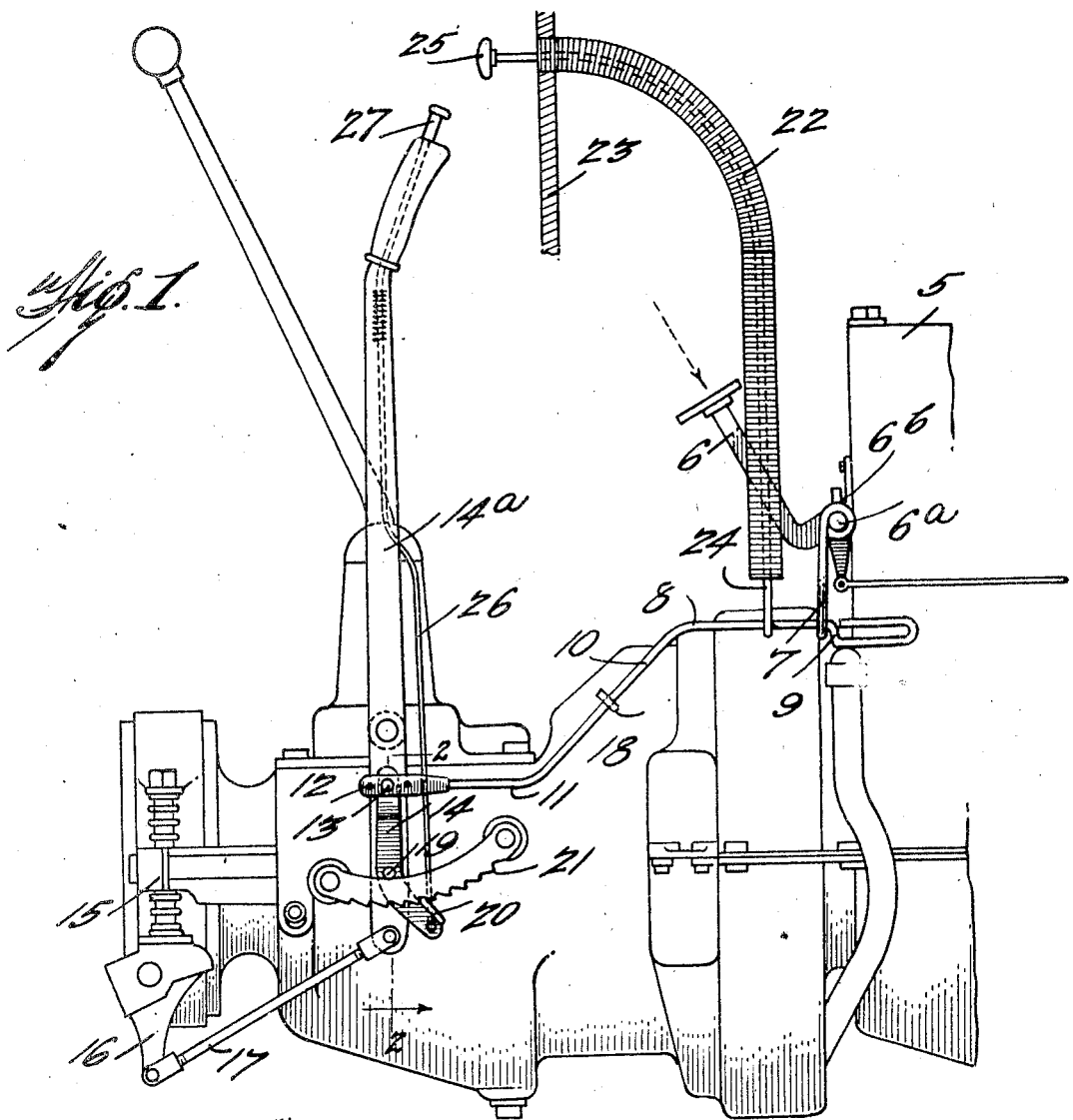
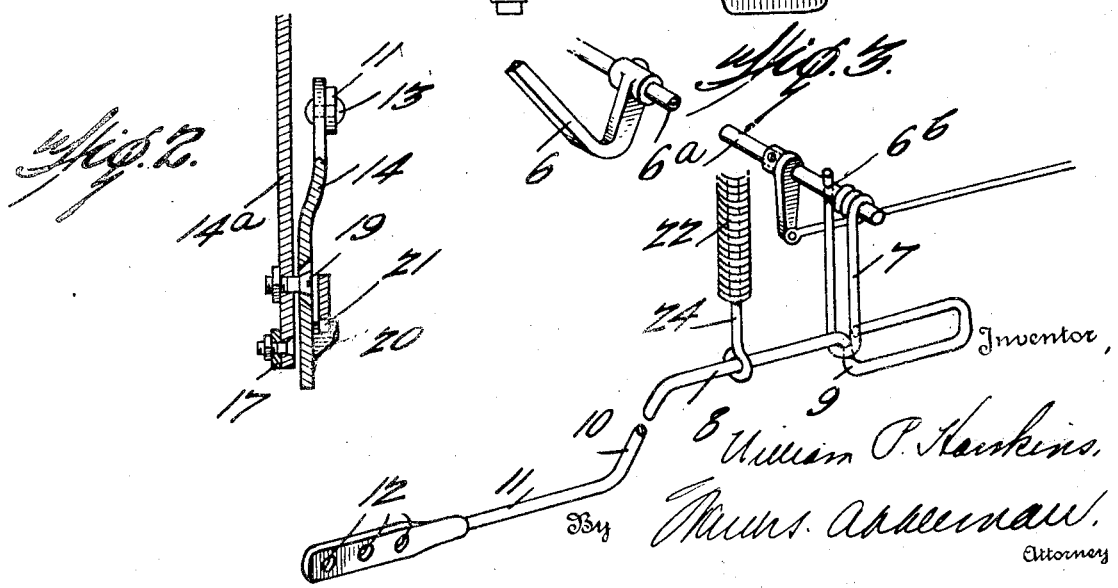

Patented Sept. 6, 1932

1,876,498

UNITED STATES PATENT OFFICE

WILLIAM P. HAWKINS, OF EL PASO, TEXAS

BRAKE RELEASE

Application filed January 8, 1932. Serial No. 585,573.

This invention relates to motor vehicles, and more particularly to a device for releasing the brakes to insure against the running of the motor vehicle while the brakes are applied.

It is well known that operators frequently fail to release the emergency brake and therefore run the motor vehicle with the brake applied, which will unduly wear the brake linings and sometimes burn them.

It is an object of this invention to provide novel means whereby the accelerating controls of the motor are relied upon and act to operate mechanism which is effective to release the emergency brake, and the relation of parts is such that the means for increasing the fuel supply to the motor actuate the brake release.

It is furthermore an object of this invention to provide novel means whereby the part of the device which is actuated when the accelerator is moved is automatically thrown out of position where it is in operative relation with the accelerator moving part after the brake is released so that the accelerator may be moved to increase or diminish the supply of fuel without encountering a part of the mechanism relied upon to impart motion to the emergency brake release.

It is a still further object of this invention to provide novel means by which the parts may be shifted to hold the part of the device which is moved through the action of the accelerator out of the path of travel of the accelerator attachment, in the event of the same not being accomplished by the natural operation of the parts. This last mentioned instrumentality is sometimes found desirable for use where the floor of a garage is on an incline or uneven, as will presently appear.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in elevation of a fragment of a motor with the emergency brake and other parts associated with it; and Figures 2 and 3 are detail views of parts of the mechanism.

In this drawing 5 denotes the rear end of the motor and this, of course, will be provided with the ordinary foot brake and clutch pedals (not shown) and with an accelerator pedal 6 which may be of ordinary type for operating the accelerator shaft $6^a$ which, in practice, should be slightly longer than those which are ordinarily a part of the installation in motors used in vehicles. The added length of the accelerator shaft is provided so that it will project outwardly far enough to avoid interference with the throttle lever of the carburetor, when the shaft is supplied with the attachment forming part of this invention.

In the present embodiment of the invention, an arm 7 is so attached to the accelerator shaft or a part thereof as to be oscillated as the pedal is pressed by the foot for accelerating the engine or supplying additional fuel. The arm may consist of a rod of such rigidity as will withstand strain, or it might consist of a plate having a slot extending to a location near its lower end. When a rod is employed it may be formed U-shaped and one end thereof wound around the shaft whereas the other end can be inserted through the shaft as shown at $6^b$ to insure that the arm shall take motion from the shaft. These are obvious mechanical equivalents as the only function of the arm is to impart motion to the rod 8 which has its free end provided with a shoulder 9 which is engaged by the arm 7 in its movement in one direction. The rod 8 has an angularly disposed portion 10 which, in the present illustration, extends downwardly on an incline and terminates in a horizontally disposed portion 11. The end of the horizontally disposed portion 11 is flattened and provided with apertures 12, any one of which may receive a pivotal pin 13 by which the rod is connected to a lever 14 that is pivoted on the brake operating lever $14^a$. The purpose of the plurality of holes is to afford an adjustment, in order that the rod may be connected to the brake lever in position to compensate for the movement of the brake lever when it is operated to apply the emergency brake which is generally identified by the numeral 15. The brake is of conventional type and, as a means for operating it, an arm 16 is provided, to which a link 17 is pivoted, the said link being attached to the lower end of the brake lever. The inclined or diagonally disposed portion 10 of the rod is guided by and fulcrumed on a bracket 18 carried by the part of the casing of the installation, for a purpose to be presently explained.

The lever 14 is mounted on a pivot 19 carried by the brake lever 14ª and the said lever 14 has a ratchet tooth or dog 20 which is adapted to engage the teeth of the segment 21 for holding the brake lever against movement after the emergency brake has been set until such time as the lever 14 is operated to release the brake.

When the emergency brake is set and the dog 20 is in engagement with one of the teeth of the segment 21, the parts of the mechanism described will be in the position in which they are shown in Figure 1. Assuming that the motor is started and the operator shifts the gearing and clutch to start the vehicle without releasing the emergency brake and operates the accelerator to furnish additional fuel to the motor, the operation of the accelerator lever 6 will cause the arm 7 to engage the shoulder 9 and thrust the rod 8 toward the motor. This operation will exert a pull on the lever 14 and cause a disengagement of the dog 20, and the teeth of the segment and the springs of the brake will exert force to pull the brake lever and operate the brake shoes. During the movement of the rod 8, it will be guided upwardly to an elevated position, as compared to that which it occupies in Figure 1, and the relation of parts is such that the movement will cause the shoulder 9 to rise above that portion of the arm 7 which engages it so that the accelerator can then be moved and the arm 7 can oscillate without encountering the shoulder 9 or imparting further motion to the rod 8 and this relation of parts will be maintained until the emergency brake is again moved to operative position when, of course, the engagement of the dog 20 with the teeth of the segment 21 will restore the parts to the position in which they are shown in Figure 1.

As a precaution against the continued occupation of the position of the shoulder 9 of the rod 8 in the position in which it is shown in Figure 1, a manually operated device is provided which will act to raise or lower that part of the arm having the shoulder 9 so that it may be elevated out of the range of action of the arm 7, or lowered so that it will be in operative relation to the arm 7, in which position it is shown in Figure 1. In order to accomplish the last mentioned result, a friction tube 22, preferably comprising a coiled wire, is suspended from the instrument board 23 or some other part of the body structure and the said tube extends downwardly and terminates above the rod 8. A wire 24 sufficiently flexible to move in the tube and sufficiently rigid to lift the rod 8 and maintain its position in the tube is movably applied to the tube and it may be provided at its upper end with a handle 25.

The wire 24 will operate to lift the shoulder 9 clear of the path of movement of the arm 7 and therefore, if a driver did not want the brake to release with the operation of the accelerator, the wire 24 would be pulled to lift the rod 8 with its shoulder 9 clear of the arm 7. The accelerator could therefore be operated and the automobile would be held against movement by the brake which is set.

A rod 26 is attached to the lower end of the lever and extends along the handle 14ª and is attached to the rod 27 of a ratchet control such as is commonly employed in levers of this type. The rod is effective to normally pull the dog 20 into engagement with the teeth of the segments 21.

From what has been stated of the operation of the device or the parts thereof, in connection with a description of the elements of the mechanism embodying the invention, one skilled in the art will, it is thought, understand the purposes and functions of the several parts without a résumé of the operation.

I claim:

1. In a brake release, an emergency brake operating lever, a lever pivoted thereto near its lower end, a tooth engaging element carried by the last mentioned lever for engaging a rack and operative to hold the brake lever in different positions of adjustment, an element connected to the second mentioned lever, an accelerator operating means, and means for communicating the motion of the accelerator operating means to the second mentioned lever for releasing the emergency brake.

2. In a brake release, an emergency brake operating lever, a lever pivoted thereto near its lower end, a dog carried by the last mentioned lever for engaging a rack to hold the brake applied, a rod pivotally connected to the second mentioned lever, the said rod having portions angularly disposed with relation to each other, the end portions being on planes approximately parallel to each other, means for guiding the intermediate portion of the said rod, a shoulder on the said rod remote from its connection with the second mentioned lever, a motor accelerator, and means for communicating the motion of the accelerator to the rod.

3. In a brake release, an emergency brake operating lever, a lever pivoted thereto near its lower end, a tooth engaging element carried by the last mentioned lever for engaging a rack and operative to hold the brake lever in different positions of adjustment, a rod pivoted to the second mentioned lever and operative to move the lever to cause a disengagement of the dog and teeth of the rack, an accelerator operating element, and means for communicating the motion of said element to the rod for moving it endwise and operating the second mentioned lever.

4. In a brake release, an emergency brake operating lever, a lever pivoted thereto near its lower end, a tooth engaging element carried by the last mentioned lever for engaging a rack and operative to hold the brake lever in different positions of adjustment, a rod pivoted to the second mentioned lever and operative to move the lever to cause a disengagement of the dog and teeth of the rack, a shoulder on the said rod, an accelerator operating element, and an arm connected to the said accelerator operating element engaging the said shoulder for communicating the motion of said element to the rod and moving said rod endwise.

5. In a brake release, an emergency brake operating lever, a lever pivoted thereto near its lower end, a tooth engaging element carried by the last mentioned lever for engaging a rack and operative to hold the brake lever in different positions of adjustment, a rod pivoted to the said second mentioned lever and operative to move the lever to cause a disengagement of the dog and teeth of the rack, a shoulder on said rod, an accelerator for a motor, means for operating the accelerator, an oscillatably mounted arm, and means for communicating the motion of the accelerator to the said arm and projecting the said rod.

6. In a brake release, an emergency brake, a pivotally mounted lever connected to an operative part of the emergency brake, a detent for holding the lever in position to retain the brake in braking position, an element connected to said lever, a control for an engine fuel feed to which said element is connected, and means for communicating the motion of the said control to the lever for releasing the emergency brake.

WILLIAM P. HAWKINS.